US006681240B1

(12) United States Patent
Armstrong et al.

(10) Patent No.: US 6,681,240 B1
(45) Date of Patent: Jan. 20, 2004

(54) APPARATUS AND METHOD FOR SPECIFYING MAXIMUM INTERACTIVE PERFORMANCE IN A LOGICAL PARTITION OF A COMPUTER SYSTEM INDEPENDENTLY FROM THE MAXIMUM INTERACTIVE PERFORMANCE IN OTHER PARTITIONS

(75) Inventors: William Joseph Armstrong, Kasson, MN (US); Lynn Allen McMahon, Rochester, MN (US); Jeffrey Jay Scheel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,541

(22) Filed: May 19, 1999

(51) Int. Cl.[7] .................................................. G06F 9/00

(52) U.S. Cl. .................... 709/104; 709/226; 712/13

(58) Field of Search .............................. 709/102, 103, 709/202, 100, 226, 1, 101, 104; 395/670, 674, 650, 673, 500.48, 161; 364/146; 712/13; 713/100

(56) References Cited

U.S. PATENT DOCUMENTS

| | | | |
|---|---|---|---|
| 3,641,505 A | 2/1972 | Artz et al. | 340/172.5 |
| 4,511,964 A | 4/1985 | Georg et al. | 364/200 |
| 4,601,008 A | 7/1986 | Kato | 364/900 |
| 4,843,541 A | 6/1989 | Bean et al. | 364/200 |
| 4,924,378 A | 5/1990 | Hershey et al. | 364/200 |
| 5,129,088 A | 7/1992 | Auslander et al. | 395/700 |
| 5,204,897 A | 4/1993 | Wyman | 380/4 |
| 5,253,344 A | 10/1993 | Bostick et al. | 395/275 |
| 5,263,158 A | 11/1993 | Janis | 395/600 |

(List continued on next page.)

FOREIGN PATENT DOCUMENTS

| | | | |
|---|---|---|---|
| JP | 62-283496 | * | 9/1987 |
| JP | 63-183700 | * | 7/1988 |
| JP | 07-200492 | | 8/1995 |
| JP | 10-111797 | | 4/1998 |
| JP | 10-301795 | | 11/1998 |

OTHER PUBLICATIONS

Gomes, Lee, "Desktops to get OS freedom of choice," Wall Street Journal Online, Mar. 26, 1999.
VMWare 1.0.x for Linux Changelog Archive (1999).
Hauser, "Does Licensing Require New Access Control Techniques?", Nov. 1994, Communications of the ACM, v37n11, pp. 84–55, dialog copy pp. 1–10.

(List continued on next page.)

Primary Examiner—Zarni Maung
(74) Attorney, Agent, or Firm—Martin & Associates, LLC; Derek P. Martin

(57) ABSTRACT

A partitioner for creating logical partitions allows a user to specify maximum interactive performance in one partition independently of maximum interactive performance of other partitions to arrive at logical partitions that may be much different than the maximum overall interactive performance percentage of the computer system itself. First, the maximum interactive performance for a computer system is specified, and resources are allocated accordingly. Next, logical partitions may be created, which initially reflect the maximum interactive performance for the computer system as a whole. Finally, the maximum interactive performance can be specified for a partition independently of the interactive performance in other partitions. In this manner a computer system that is configured as a server system with low interactive and high batch performance can have two different partitions, one that has very low interactive performance and the other that balances interactive and batch processing. In this manner two partitions that have greatly different performance attributes can be defined within the limitations of the specified interactive and batch performance for the computer system as a whole.

11 Claims, 5 Drawing Sheets

U.S. PATENT DOCUMENTS

| | | | |
|---|---|---|---|
| 5,297,287 A | 3/1994 | Miyayama et al. | 395/700 |
| 5,345,590 A | 9/1994 | Ault et al. | 395/650 |
| 5,365,514 A | 11/1994 | Hershey et al. | 370/17 |
| 5,375,206 A | 12/1994 | Hunter et al. | 395/200 |
| 5,446,902 A | 8/1995 | Islam | 395/700 |
| 5,465,360 A | 11/1995 | Miller et al. | 395/700 |
| 5,526,488 A | 6/1996 | Hershey et al. | 395/200.2 |
| 5,550,970 A | 8/1996 | Cline et al. | 395/161 |
| 5,566,337 A | 10/1996 | Szymanski et al. | 395/733 |
| 5,574,914 A | 11/1996 | Hancock et al. | 395/650 |
| 5,600,805 A | 2/1997 | Fredericks et al. | 395/825 |
| 5,659,756 A | 8/1997 | Hefferon et al. | 395/726 |
| 5,659,786 A | 8/1997 | George et al. | 395/653 |
| 5,671,405 A | 9/1997 | Wu et al. | 395/607 |
| 5,675,791 A | 10/1997 | Bhide et al. | 395/621 |
| 5,684,974 A | 11/1997 | Onodera | 395/412 |
| 5,687,363 A | 11/1997 | Oulid-Aissa et al. | 395/604 |
| 5,692,174 A | 11/1997 | Birely et al. | 395/603 |
| 5,692,182 A | 11/1997 | Desai et al. | 395/610 |
| 5,742,757 A | 4/1998 | Hamadani et al. | 395/186 |
| 5,784,625 A | 7/1998 | Walker | 395/733 |
| 5,799,149 A * | 8/1998 | Brenner et al. | 709/201 |
| 5,819,061 A | 10/1998 | Glassen et al. | 395/406 |
| 5,828,882 A | 10/1998 | Hinckley | 395/680 |
| 5,845,146 A | 12/1998 | Onodera | 395/822 |
| 5,923,890 A | 7/1999 | Kubala et al. | 395/800.01 |
| 5,948,065 A | 9/1999 | Eilert et al. | 709/226 |
| 5,978,857 A | 11/1999 | Graham | 709/301 |
| 5,996,026 A | 11/1999 | Onodera et al. | 710/3 |
| 6,021,438 A | 2/2000 | Duvvoori et al. | 709/224 |
| 6,061,695 A | 5/2000 | Slivka et al. | 707/513 |
| 6,075,938 A | 6/2000 | Bugnion et al. | 395/500.48 |
| 6,148,323 A | 11/2000 | Whitner et al. | 709/105 |
| 6,173,337 B1 | 1/2001 | Akhond et al. | 709/318 |
| 6,199,179 B1 | 3/2001 | Kauffman et al. | 714/26 |
| 6,219,728 B1 * | 4/2001 | Yin | 709/104 |
| 6,247,109 B1 | 6/2001 | Kleinsorge et al. | 712/13 |
| 6,263,359 B1 | 7/2001 | Fong et al. | 709/103 |
| 6,269,391 B1 | 7/2001 | Gillespie | 709/100 |
| 6,269,409 B1 | 7/2001 | Solomon | 709/329 |
| 6,282,560 B1 | 8/2001 | Eilert et al. | 709/100 |
| 6,496,847 B1 | 12/2002 | Bugnion et al. | |

OTHER PUBLICATIONS

McGilton et al., "Introducing the UNIX System," 1983, R.R. Donnelley & Sons Company, pp. 515–521.

Abstract for JAPIO Application No. 94–103092, T. Imada et al., Apr. 15, 1994, "Virtual Computer System."

Abstract for JAPIO Application No. 92–348434, T. Imada et al., Dec. 3, 1992, "Virtual Computer System."

Inspec Abstract No. C9408–6110P–022, A. B. Gargaro et al., Mar. 1994, "Supporting Distribution and Dynamic Reconfiguration in AdaPT."

VMWare Virtual Platform—Technology White Paper, http:vmware.com/products/virtualplatform.html (1999).

IBM Technical Disclosure Bulletin, Kreulen, "OS/2 Raw FileSystem," vol. 40, No. 05, pp. 177–190, May 1997.

IBM Technical Disclosure Bulletin, Baskey et al., "Highly Parallel Coupling Facility Emulator/Router with Shadowed Link Buffers," vol. 39, No. 12, pp. 123–124, Dec. 1996.

U.S. patent application RO999–022, "Processor Reset Generated via Memory Access Interrupt," filed May 19, 1999, Armstrong et al.

U.S. patent application RO999–023, "Management of a Concurrent Use License in a Logically–Partitioned Computer," filed May 19, 1999, Armstrong et al.

U.S. patent application RO999–024, "Event–Driven Communications Interface for Logically–Partitioned Computer," filed May 19, 1999, Armstrong et al.

U.S. patent application RO999–025, "Logical Partition Manager and Method," filed May 19, 1999, Armstrong et al.

"Microsoft Computer Dictionary," Microsoft Press, 4th Edition, 1999.

"S/390 Parallel Enterprise Server –Generation 3, S/390 Coupling Facility Model C04, System Overview," Publication GA22–7150–00, IBM Japan, 1997.

* cited by examiner

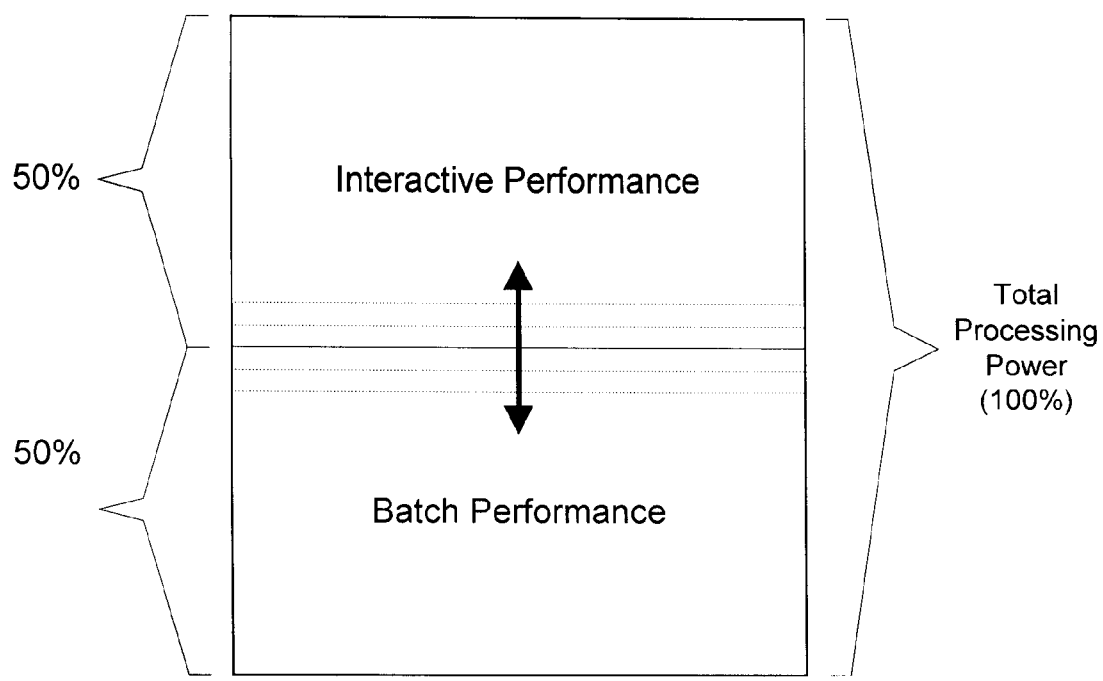
FIG. 2  Traditional Model
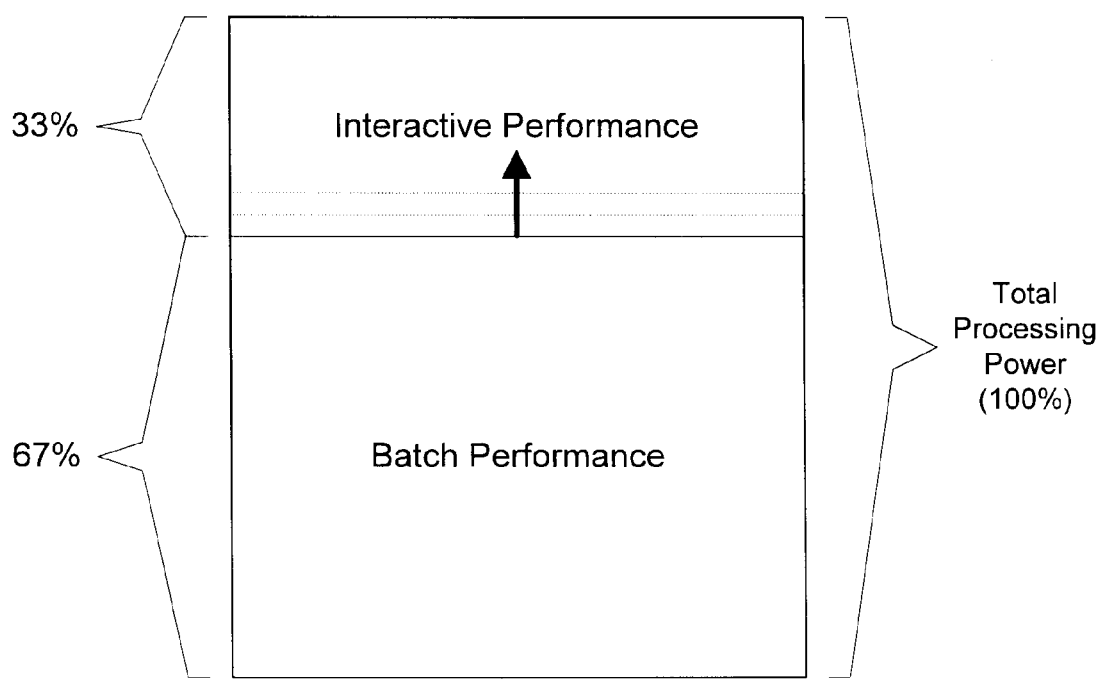
FIG. 3  Server Model

APPARATUS AND METHOD FOR SPECIFYING MAXIMUM INTERACTIVE PERFORMANCE IN A LOGICAL PARTITION OF A COMPUTER SYSTEM INDEPENDENTLY FROM THE MAXIMUM INTERACTIVE PERFORMANCE IN OTHER PARTITIONS

RELATED APPLICATIONS

This patent application is related to the following patent applications: U.S. patent application RO999-022, entitled "Processor Reset Generated via Memory Access Interrupt," Ser. No. 09/314,769 filed May 19, 1999 by Armstrong et al., now U.S. Pat. No. 6,467,007; U.S. Pat. application RO999-023, entitled "Management of a Concurrent Use License in a Logically-Partitioned Computer," Ser. No. 09/314,324 filed May 19, 1999 by Armstrong et al.; U.S. patent application RO999-024, entitled "Event-Driven Communications Interface for Logically-Partitioned Computer," Ser. No. 09/314,187 filed May 19, 1999 by Armstrong et al.; and U.S. patent application RO999-025, entitled "Logical Partition Manager and Method," Ser. No. 09/314,214 filed May 19, 1999 by Armstrong et al.

BACKGROUND OF THE INVENTION

1. Technical Field

This invention generally relates to data processing, and more specifically relates to logical partitioning in a computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The AS/400 computer system developed by IBM is an example of a computer system that supports logical partitioning. If logical partitioning on an AS/400 is desired, partition manager code (referred to as a "hypervisor" in AS/400 terminology) allows defining different computing environments on the same platform. The partition manager manages the logical partitions to assure that they can share needed resources in the computer system while maintaining the separate computing environments defined by the logical partitions.

A logical partition is defined by a set of computer resources that are allocated to the partition. These resources typically include processors, main memory, and input/output (I/O) devices. Some partitions may be defined along hardware boundaries. For example, in a system with six processors, two processors could be allocated to a first logical partition, and the remaining four could be allocated to a second logical partition. However, it is also possible to allocate partitions along logical boundaries that do not directly coincide with hardware boundaries. For example, if the total computing power in a system is measured in cycles, a certain percentage of cycles could be allocated to a first logical partition and the remaining cycles could be allocates to a second logical partition. The partition manager is then responsible to assure that processor cycles are allocated to the partitions in the specified percentages.

Many computer systems may be customized to perform specialized tasks. For example, an engineering workstation typically has a much different configuration than a server on a network. The performance of a computer system may be measured by specifying the maximum interactive performance allowed on the computer system, thereby providing sufficient batch performance when needed. Interactive performance relates to how well the computer system handles interactive jobs that require input from a user. Batch performance relates to how well the computer system handles jobs that can be run in the background and that do not require user intervention, such as processing payroll checks or generating reports. Some computer systems allow interactive performance to be traded off against batch performance to arrive at a desired performance goal for a computer system, depending on the application. For the AS/400 computer system developed by IBM, the maximum interactive performance can be adjusted to suit particular applications.

A traditional AS/400 does not limit interactive performance, so the interactive performance can comprise any portion of the total performance, from 0 to 100%. The portion of total performance that is not currently being used for interactive performance may be used for batch performance. For an AS/400 that is used as a server on a network, it may be desirable to cap the interactive performance to a relatively small percentage of the total performance to provide adequate batch performance for the network server. In this case, the interactive performance would be relatively small compared to the batch performance, because servers run most of their jobs without user intervention or input. In fact, IBM often sells AS/400 computer systems that specify the maximum interactive performance, with the rest of the computer system performance being dedicated to batch performance. Note that batch performance may also occupy any portion of the specified maximum interactive performance that is not currently being used for interactive performance. Thus, if the maximum interactive performance is 10%, and only 5% is being used in interactive performance, the computer system can use the remaining 95% for batch processing. However, if the computer system needs to increase its interactive performance from 5% to 7%, the interactive performance will take precedence over the batch performance, up to the specified maximum interactive performance.

A problem arises when a computer system that has been tuned to a desired interactive and/or performance level is logically partitioned. If the total system is 25% maximum interactive performance, using known techniques to create two equal partitions would result in two partitions that each have 25% maximum interactive performance. However, it is foreseeable that some users may want to install different types of partitions on the same computer system If the maximum interactive performance is specified for a server, there is no way to define one partition that has more interactive performance than another partition. While specifying maximum interactive performance for a computer system is known in the art, there is currently no way to specify interactive performance for a partition that is different than the maximum interactive performance for the computer system as a whole. Without a mechanism and method for creating logical partitions in a way that provides the user more flexibility in allocating interactive performance within partitions, the computer industry will continue to suffer from logical partitions that must reflect the overall performance of the computer system.

DISCLOSURE OF INVENTION

According to the present invention, a partitioner for creating logical partitions allows a user to specify maximum interactive performance in one partition independently of maximum interactive performance of other partitions to arrive at logical partitions that may be much different than the maximum overall interactive performance percentage of the computer system itself. First, the maximum interactive performance for a computer system is specified, and resources are allocated accordingly. Next, logical partitions may be created, which initially reflect the maximum interactive performance for the computer system as a whole. Finally, the maximum interactive performance can be specified for a partition independently of the interactive performance in other partitions. In this manner a computer system that is configured as a server system with low interactive and high batch performance can have two different partitions, one that has very low interactive performance and the other that balances interactive and batch processing. In this manner two partitions that have greatly different performance attributes can be defined within the limitations of the specified interactive and batch performance for the computer system as a whole.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a block diagram showing how total processing power can be allocated between interactive performance and batch performance in a computer system to achieve a traditional processing configuration that does not constrain interactive performance;

FIG. 3 is a block diagram showing how interactive performance can be capped in a computer system below a specified maximum to achieve a server processing configuration that has substantially more dedicated batch performance than available interactive performance;

BEST MODE FOR CARRYING OUT THE INVENTION

Figure 1:
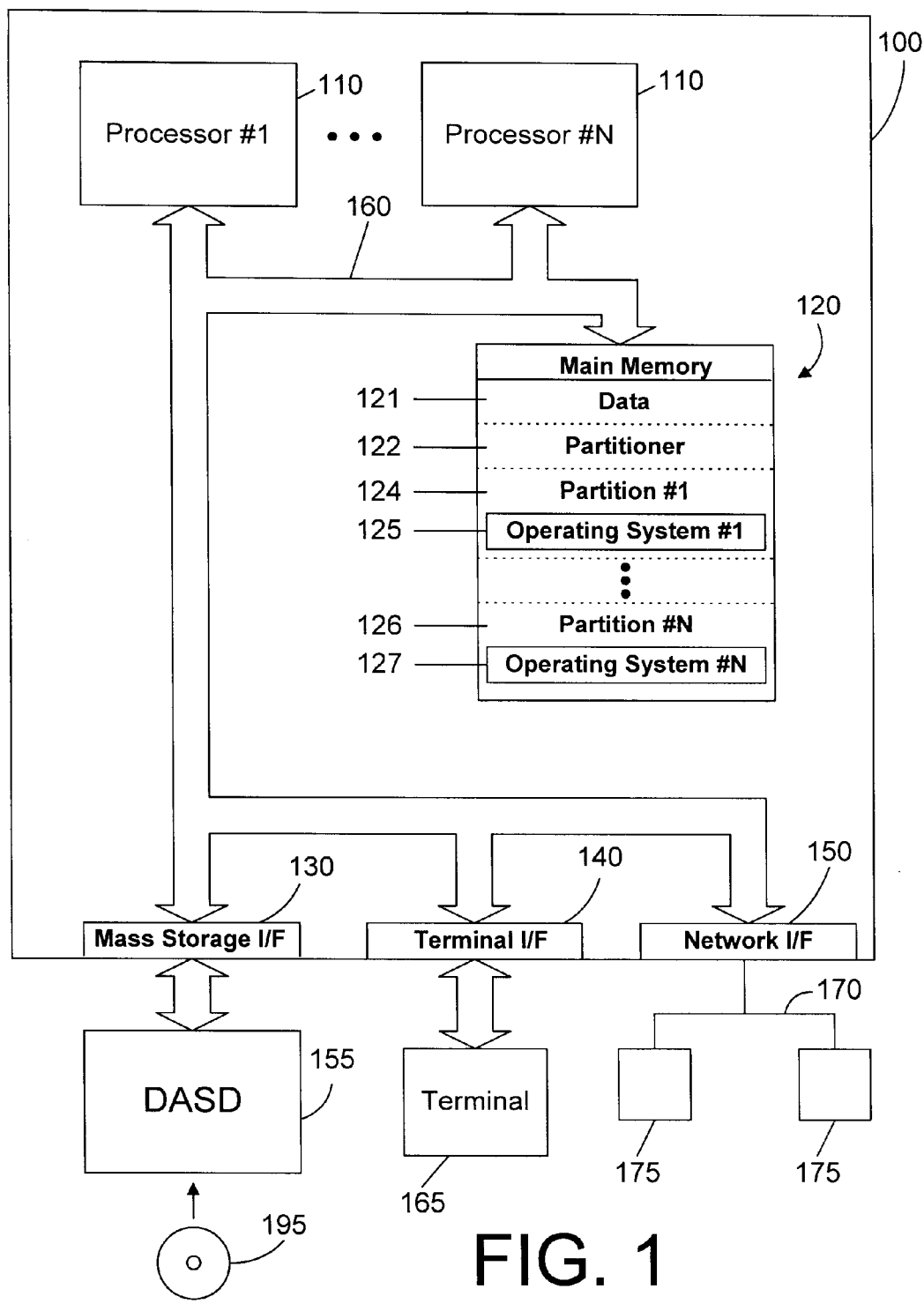
FIG. 1 is a block diagram of a computer apparatus that supports logical partitioning in accordance with the preferred embodiments.

According to preferred embodiments of the present invention, a computer system that supports logical partitioning includes a partitioner that specifies maximum interactive performance in a partition independently from the interactive performance in other partitions. Referring to FIG. 1, a computer system 100 is an enhanced IBM AS/400 computer system, and represents one suitable type of computer system that supports logical partitioning in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a CD-ROM drive, which may read data from a CD-ROM 195.

Main memory 120 contains data 121, a partitioner 122, and multiple logical partitions (such as partitions 124 and 126 in FIG. 1). Data 121 represents any data that serves as input to or output from any program in computer system 100. Partitioner 122 is used to create multiple logical partitions, represented in FIG. 1 by partitions 124 and 126. The first partition 124 includes an operating system 125, and the Nth partition 126 includes an operating system 127. Operating systems 125 and 127 are each preferably a multitasking operating system known in the industry as OS/400; however, those skilled in the art will appreciate that the spirit and scope of the present invention is not limited to any one operating system. Any suitable operating system can be used. Operating systems 125 and 127 are each sophisticated programs that contains low-level code to manage the resources of computer system 100. Some of these resources are processor 110, main memory 120, mass storage interface 130, terminal interface 140, network interface 150, and system bus 160. The operating system 127 the Nth partition 126 may be the same as the operating system 125 in partition 124, or may be a completely different operating system. Thus, partition 124 can run the OS/400 operating system, while partition 126 can run another instance of OS/400, possibly a different release, or with different environment settings (e.g., time zone). The operating system 127 in the Nth partition 126 could even be different than OS/400, provided it is compatible with the hardware. In this manner the logical partitions can provide completely different computing environments on the same physical computer system.

The partitions 124 and 126 are shown in FIG. 1 to reside within the main memory 120. However, one skilled in the art will recognize that a partition is a logical construct that includes resources other than memory. A logical partition typically specifies a portion of memory, along with an assignment of one or more processors and other system resources. Thus, partition 124 could be defined to include two processors and a portion of memory 120, along with one or more I/O processors that can provide the functions of mass storage interface 130, terminal interface 140, network interface 150, or interfaces to other I/O devices. Partition 126 could then be defined to include three other processors, a different portion of memory 120, and one or more I/O processors. The partitions are shown in FIG. 1 to symbolically represent logical partitions, which would include system resources outside of memory 120 within computer system 100.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, partitioner 122 and the partitions 124 and 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Each processor 110 may be constructed from one or more microprocessors and/or integrated circuits. Each processor 110 executes program instructions stored in main memory 120. Main memory 120 stores programs and data that processors 110 may access. When computer system 100 starts up, a processor 110 initially executes the program instructions that make up the partitioner 122. Partitioner 122 is a sophisticated program that contains low-level code to manage the resources of computer system 100. Some of these resources are processors 110, main memory 120, mass storage interface 130, terminal interface 140, network interface 150, and system bus 160. In addition, partitioner 122 is used to create and manage logical partitions (e.g., 124 and 126 of FIG. 1), to control the resources of computer system 100, and to perform tasks requested by the operating systems in the logical partitions.

Although computer system 100 is shown to contain only a single system bus, those skilled in the art will appreciate that the present invention may be practiced using a computer system that has multiple buses. In addition, the interfaces (called input/output processors in AS/400 terminology) that are used in the preferred embodiment each include separate, fully programmed microprocessors that are used to off-load compute-intensive processing from processors 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 195 of FIG. 1), and transmission type media such as digital and analog communications links.

A logical partition includes specific resources within computer system 100. Each logical partition has a corresponding partition memory 126 within main memory that is separate and distinct from the memory used for any other partition, and has a predetermined number of processors 110 or a predetermined number of percentage of processing cycles allocated to it. The specific allocation of system resources to specific partitions is not discussed herein because these concepts are known to one skilled in the art, and will vary greatly according to the specific hardware on the computer system being partitioned. The present invention relates to the allocation of interactive performance independently from the interactive performance in other partitions. For this reason the preferred embodiments are discussed below in terms of specified percentages of total processing power. Note that the figures below assume that the total processing power of a computer system is being used. In reality, there would likely be portions of unused processor performance that could be dynamically allocated to either interactive processing or batch processing depending on the specified maximum interactive performance and the current interactive performance. However, by assuming that the total processing power of the computer system (or partition) is being used, the discussion of the concepts of the invention are simplified. The reader will readily understand that a portion of the total processing power may be unused, and may be allocated to batch processing if needed, or may be allocated to interactive processing if adding the unused portion does not cause the interactive performance to exceed the specified maximum.

Referring to FIG. 2, the total processing power for a computer system (such as computer system 100 of FIG. 1) can be divided into the interactive performance and the batch performance of the computer system. In the example shown in FIG. 2, the interactive performance is not constrained, which corresponds to a traditional AS/400 computer system. The interactive performance is given precedence over batch processing. Thus, by not constraining the interactive performance in the system of FIG. 2, the interactive performance can range from 0 to 100% of the total system performance. This is represented in FIG. 2 by the arrows and phantom lines, indicating that the dividing line between interactive and batch performance can move up or down anywhere along the continuum of total processing power.

Referring now to FIG. 3, we can make the AS/400 better suited to a server environment by specifying that interactive performance has a maximum value of 33%. By specifying a maximum interactive performance of 33%, 67% of the total processing power is dedicated to batch performance. The division of interactive and batch performance shown in FIG. 3 is more suitable to a server environment, where batch processing is much more prevalent than interactive processing. As discussed in the background section, a computer system can be customized by specifying a maximum interactive performance to tune a computer system's performance to a desired application. By dedicating 67% of the total processing power to batch performance and specifying a 33% maximum for interactive performance, the resulting computer system is better-suited to be a network server than the traditional model shown in FIG. 2. Note that the arrow and phantom lines in FIG. 3 show that the size of the interactive performance can be reduced, but cannot be enlarged greater than the maximum specified value.

Figure 4:
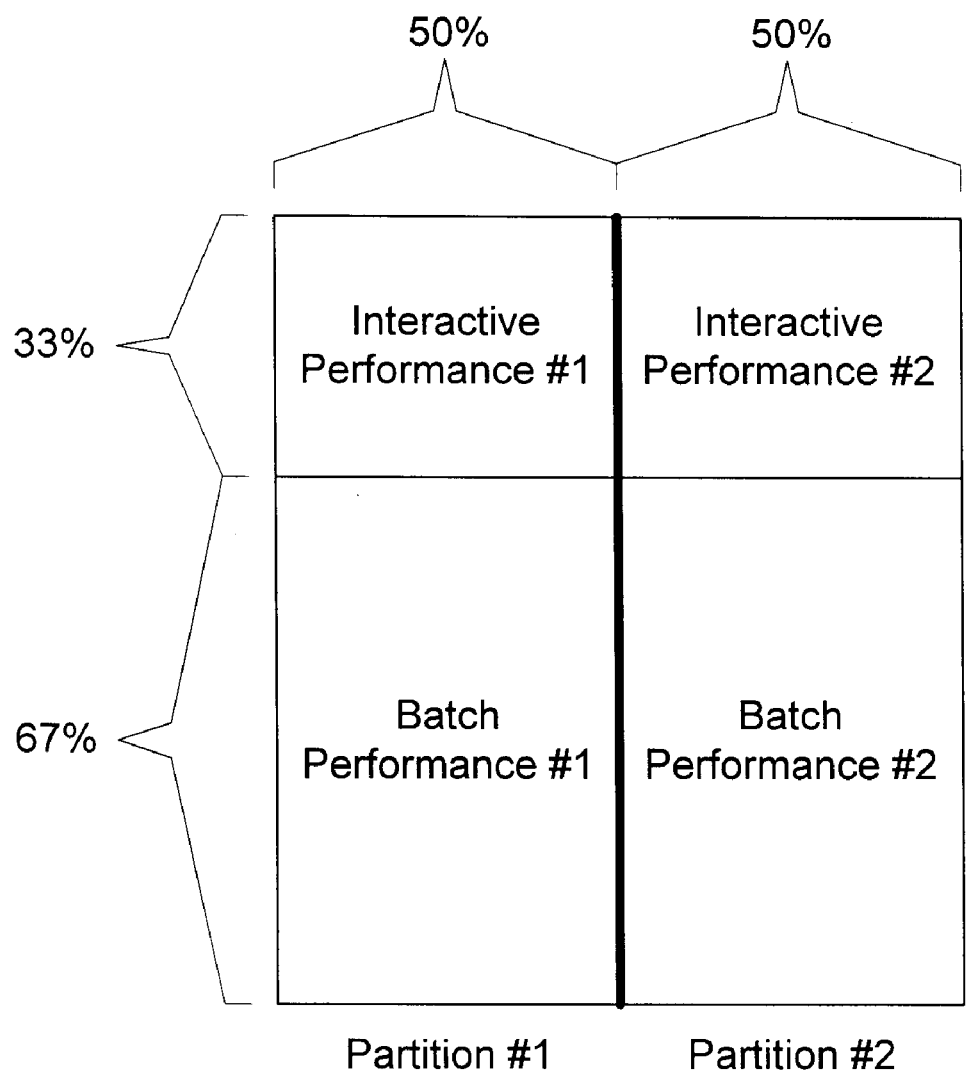
FIG. 4 is a block diagram showing the creation of two logical partitions for the server model shown in FIG. 3.

Referring to FIG. 4, if the total performance of the server computer system represented in FIG. 3 is now partitioned into two equal partitions, each partition will initially reflect the same maximum interactive performance for the overall machine. For the system of FIG. 4, this means that essentially two identical server partitions are created. While this may be very useful in some situations, it may be very desirable in other situations to define both a traditional partition and a server partition on the same computer system. The partitioner 122 of FIG. 1 makes this possible by specifying the maximum interactive performance of a partition independently from the interactive performance in other partitions.

Figure 5:
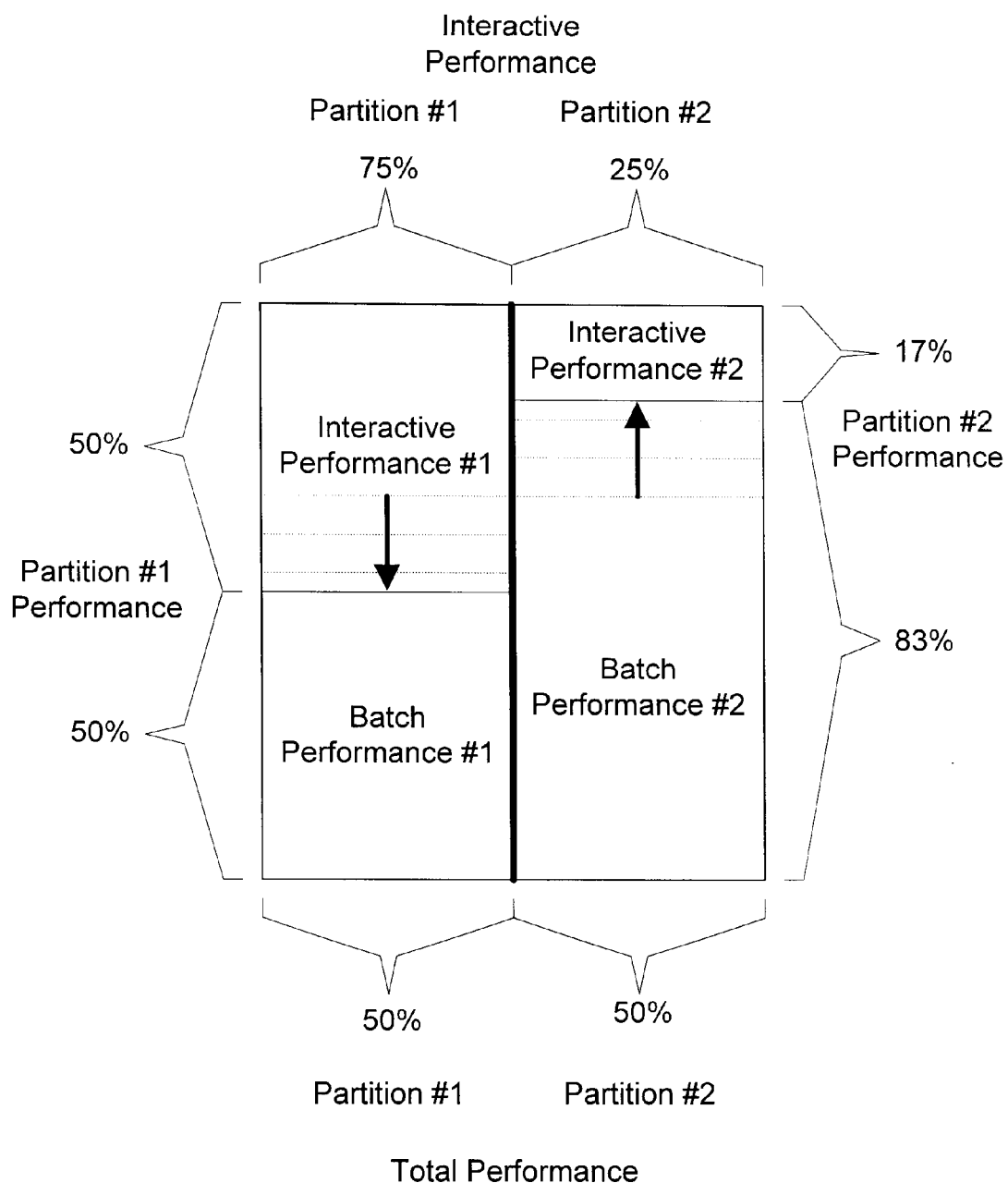
FIG. 5 is a block diagram showing the dynamic specification of maximum interactive performance independent from the interactive performance in other partitions.

Referring now to FIG. 5, two partitions have been created in accordance with the preferred embodiments to allocate the unneeded interactive performance on one partition to the other partition. Let's assume that when the partitions were initially created as shown in FIG. 4, that the first partition needs to have a maximum of 50% interactive performance, while the second partition only needs to have a maximum of 17% interactive performance. In this situation, partitioner 122 creates the first partition with a maximum interactive performance of 50%, which is approximately three times greater than the interactive performance of the second partition. Partitioner 122 then creates the second partition, as shown in FIG. 5, that has a 17% maximum for the interactive performance, with the rest being dedicated to batch performance. In this manner the first partition of FIG. 5 can be used as a more traditional partition, while the second partition can be used as a server partition. Note that the total amount of interactive performance is constrained by the maximum 33% interactive performance specified in the initial system configuration of FIG. 3. This 33% interactive performance is allocated among the two partitions as shown in FIG. 5, with 75% of the maximum interactive performance being allocated to the first partition and 25% of the maximum interactive performance being allocated to the second partition. The present invention thus allows different types of partitions to be defined on the same computer system by allocating interactive performance for a logical partition independently of the interactive performance of other logical partitions.

Figure 6:
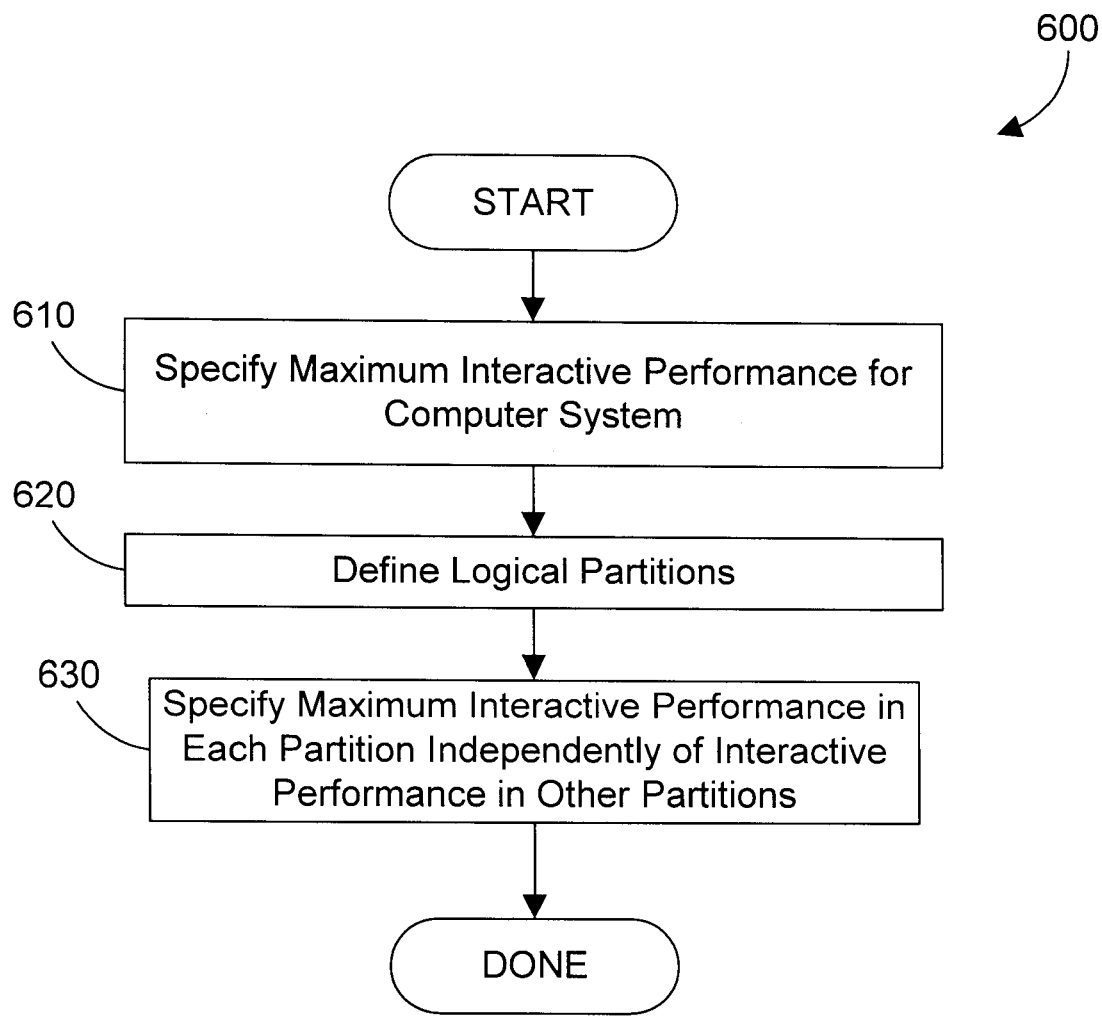
FIG. 6 is a flow diagram of a method for specifying maximum interactive performance in a partition independently from the interactive performance in other partitions according to the preferred embodiments.

Referring now to FIG. 6, a method 600 for specifying maximum interactive performance for multiple partitions begins by specifying a maximum interactive performance for the computer system as a whole (step 610). Step 610 creates the initial maximum percentage allocation to interactive performance, as shown in FIG. 3, using methods known in the art. Next, logical partitions are defined (step 620). One suitable example for creating logical partitions in step 620 is shown by the two logical partitions in FIG. 4. Finally, a maximum value for the interactive performance is specified for each partition independently of the interactive performance in the other partitions (step 630). A suitable example of this allocation is shown in FIG. 5, where the maximum interactive performance for the first partition is 50% while the maximum interactive performance for the second partition is 17%.

The present invention as described above comprises a partitioner and method for specifying maximum interactive performance in a logical partition independently of the interactive performance in other partitions. One very simplified example is now presented to illustrate the concepts discussed in the preferred embodiments. We assume that we are dealing with a computer system that has twelve processors. We also assume that the interactive and batch processing for the system is initially allocated as shown in FIG. 3, with up to 33% of the performance allocated to interactive performance and 67% of the performance dedicated to batch performance. If partitioning is performed along processor boundaries, this means that four of the twelve processors are allocated to interactive performance, and eight of the twelve are dedicated to batch performance. Of course, the four processors allocated to interactive performance may also be used for batch performance if the interactive performance is less than its specified maximum.

When the system of FIG. 3 is partitioned into two equal partitions as shown in FIG. 4, the interactive performance is split equally between partitions, and the batch performance is split equally between partitions. This means that two processors are allocated to the interactive performance of the first partition, four processors are allocated to the batch performance of the first partition, two processors are allocated to the interactive performance of the second partition, and four processors are allocated to the batch performance of the second partition. Thus, two identical partitions have been created that both mirror the maximum interactive performance of the system as a whole. Now, in referring to FIG. 5, if we assume that the first partition needs a maximum of 50% of its performance to be interactive performance, one of the four dedicated batch processors can be allocated to providing interactive performance as well. If the second partition only needs half of the specified interactive performance for the system (17%), the interactive performance of the partition can be satisfied with one of the two processors previously allocated to interactive performance, thereby freeing up one processor that is now dedicated to batch performance. The result is that the first partition has up to three processors for its interactive performance and three processors dedicated to its batch performance, while the second partition has one processor for its interactive performance and five processors dedicated to its batch performance. This simplified example shows how partitioner 122 of FIG. 1 can specify maximum interactive performance in a partition independently from the interactive performance in other partitions. Of course, as explained above, allocation between interactive and batch performance can occur on a percentage basis that does not correspond to hardware boundaries, and the present invention expressly extends to any method for allocating between interactive and batch performance.

The preferred embodiments discussed above discuss partitioning in a static context, meaning that partitions are defined when the partitions are initially setup, and these partitions are enforced during run-time. However, the present invention also extends to dynamic allocation of interactive performance at run-time. The partitioner of the present invention may include a run-time portion that analyzes interactive performance needs of each partition, and dynamically allocates the interactive performance between partitions as programs are executing.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:

at least one processor;

a memory coupled to the at least one processor;

a plurality of logical partitions defined on the apparatus, each logical partition including a portion of the at least one processor and a portion of the memory, each logical partition specifying a maximum interactive performance; and a partitioner that specifies the maximum interactive performance of one of the plurality of logical partitions independently of the interactive performance of other of the plurality of logical partitions.

2. The apparatus of claim 1 wherein the partitioner specifies the maximum interactive performance of the plurality o logical partitions when the plurality of logical partitions are initially created and configured.

3. The apparatus of claim 1 wherein the partitioner dynamically specifies the maximum interactive performance of the plurality of logical partitions at run-time.

4. An apparatus comprising:

at least one processor;

a memory coupled to the at least one processor;

a plurality of logical partitions defined on the apparatus, each logical partition specifying a maximum interactive performance;

a first of the plurality of logical partitions having a first maximum interactive performance specification; and a second of the plurality of logical partitions having a second maximum interactive performance specification that is different than the first maximum interactive performance specification.

5. An apparatus comprising:

at least one processor;

a memory coupled to the at least one processor;

a plurality of logical partitions defined on the apparatus, each logical partition including a portion of the at least one processor and a portion of the memory, each logical partition specifying a maximum interactive performance; and means for specifying the maximum interactive performance of one of the plurality of logical partitions independently of the interactive performance of other of the plurality of logical partitions.

6. A computer-implemented method for creating at least one logical partition on a computer system, the method comprising the steps of:

creating a first logical partition that specifies a first maximum interactive performance specification;

creating a second logical partition that specifies a second maximum interactive performance specification that is different than the first maximum interactive performance specification.

7. A program product comprising:

a partitioner that specifies maximum interactive performance of one of a plurality of logical partitions independently of interactive performance of other of the plurality of logical partitions; and signal bearing media bearing the partitioner.

8. The program product of claim 7 wherein the signal bearing media comprises recordable media.

9. The program product of claim 7 wherein the signal bearing media comprises transmission media.

10. The program product of claim 7 wherein the partitioner specifies the maximum interactive performance of the plurality logical partitions when the plurality of logical partitions are initially created and configured.

11. The program product of claim 7 wherein the partitioner dynamically specifies the maximum interactive performance of the plurality of logical partitions at run-time.

* * * * *

UNITED STATES PATENT AND TRADEMARK OFFICE
CERTIFICATE OF CORRECTION

PATENT NO. : 6,681,240 B1 Page 1 of 1
DATED : January 20, 2004
INVENTOR(S) : William Joseph Armstrong et al.

It is certified that error appears in the above-identified patent and that said Letters Patent is hereby corrected as shown below:

Column 9,
Line 16, "o" should read -- of --.

Signed and Sealed this

Thirteenth Day of April, 2004

JON W. DUDAS
*Acting Director of the United States Patent and Trademark Office*